United States Patent Office

PTO - BOYERS, PA Duty Station

MISSING PAGE TEMPORARY NOTICE

PATENT # X0007964 FOR ISSUE DATE 1-21-1834

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All Drawings

Data Conversion Operation

Boyers, Pa

7964X

UNITED STATES PATENT OFFICE.

WILLIAM NORWOOD, JOHN BURNS, JABEZ ROWE, AND J. HASKELL, OF GLOUCESTER, MASSACHUSETTS.

IMPROVEMENT IN THE MANUFACTURING OF ISINGLASS OR ICHTHYOCOLLA.

Specification forming part of Letters Patent, dated January 21, 1834.

WILLIAM NORWOOD, JOHN BURNS, JABEZ ROWE, and J. HASKELL. The schedule referred to in these Letters Patent and making part of the same, containing a description, in the words of the said WILLIAM NORWOOD, JOHN BURNS, JABEZ ROWE, and JOSIAH HASKELL themselves, of their Improvement in Making Isinglass or Ichthyocolla.

*To all to whom these presents shall come:*

Be it known that we, WILLIAM NORWOOD, JOHN BURNS, JABEZ ROWE, and JOSIAH HASKELL, all of Gloucester, in the county of Essex and State of Massachusetts, have invented a new and useful Improvement in the Manufacturing of Isinglass or Ichthyocolla, and that the following is a full and exact description of the said manufacture as invented or improved by us.

Take the sounds of the fish, after they have been cleansed from all blood and fishy particles and dried, soak them in fresh water from three to six hours, as they may require, after which pass them through a machine or mill consisting of a roller and knives to cut them into small pieces, then break them through iron or composition rollers until it becomes like unto paste, and thus continue it through said rollers until it is run into long strips or strings, as ribbons. These strips are then dried and fit for use.

What we claim in the manufacture of isinglass is—

The cutting it into fine pieces through a machine with knives, breaking it into paste, and running it into thin strips.

WILLIAM NORWOOD.
JOHN BURNS.
JABEZ ROWE.
JOSIAH HASKELL.

Witnesses:
JABEZ R. GOTT,
EBENEZER ROWE.